M. W. PETERSON.
TRACTION WHEEL.
APPLICATION FILED MAR. 21, 1913.
1,113,477.
Patented Oct. 13, 1914.
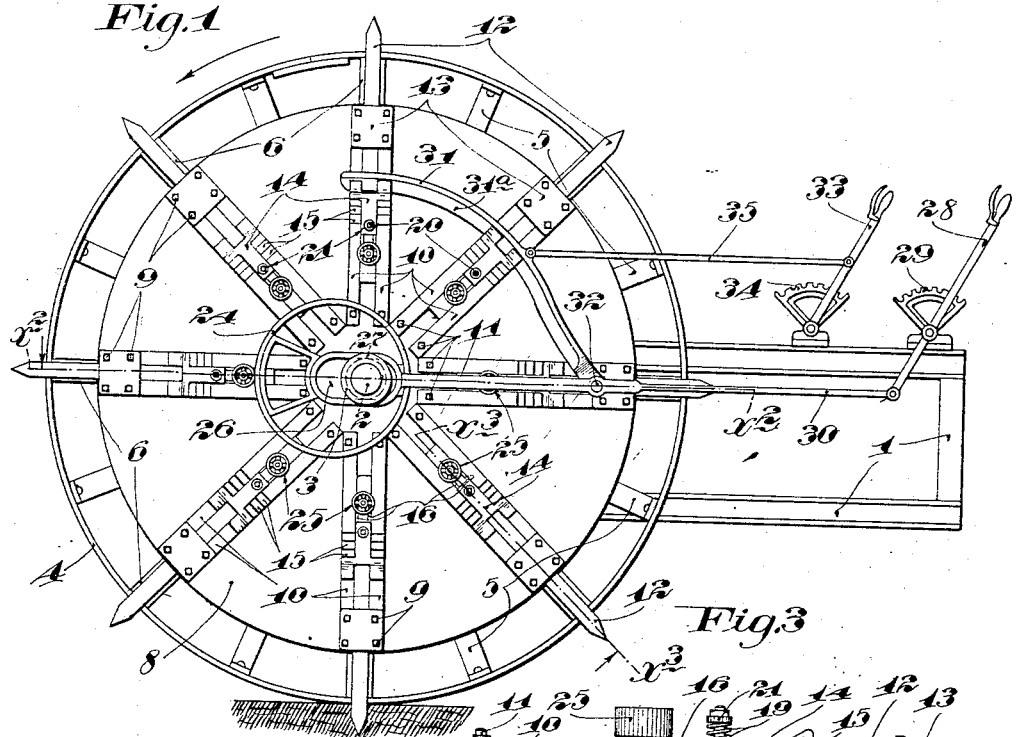
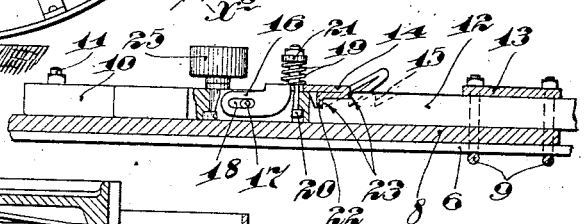
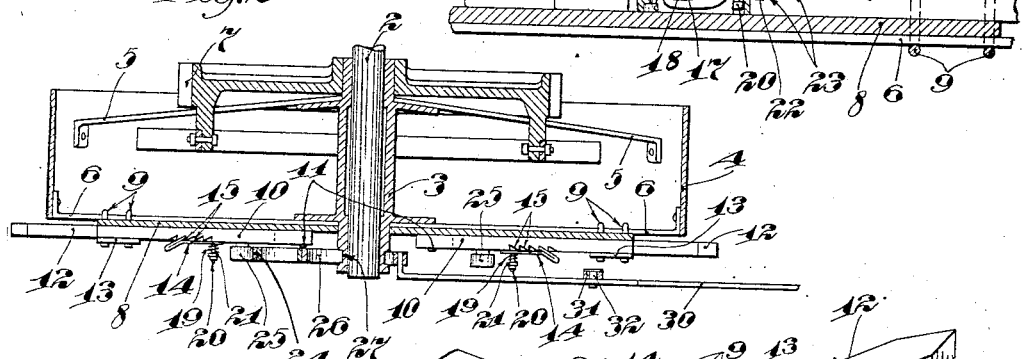
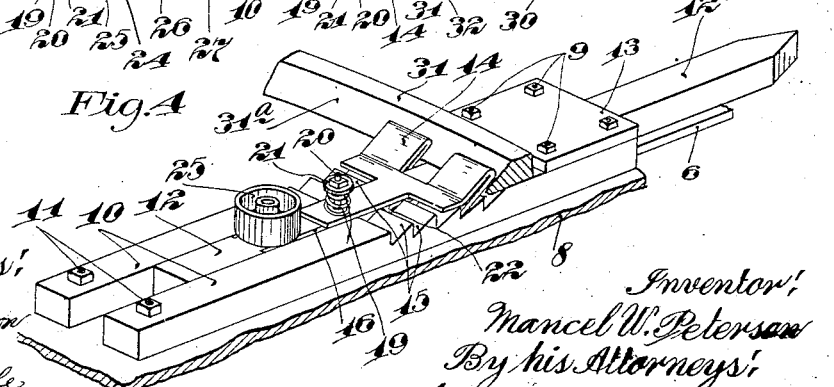
Witnesses:
Geo. Knutson
E. C. Skinkle
Inventor:
Mancel W. Peterson
By his Attorneys:
Williamson Merchant

UNITED STATES PATENT OFFICE.

MANCEL W. PETERSON, OF WAUBAY, SOUTH DAKOTA.

TRACTION-WHEEL.

1,113,477.  Specification of Letters Patent.  Patented Oct. 13, 1914.

Application filed March 21, 1913. Serial No. 755,929.

*To all whom it may concern:*

Be it known that I, MANCEL W. PETERSON, a citizen of the United States, residing at Waubay, in the county of Day and State of South Dakota, have invented certain new and useful Improvements in Traction-Wheels; and I do hereby declare the following to be a full, clear, and exact description of the invention, such as will enable others skilled in the art to which it appertains to make and use the same.

My invention relates to improvements in traction devices for vehicle wheels and, to this end, it consists of the novel devices and combinations of devices hereinafter described and defined in the claims.

The invention is illustrated in the accompanying drawings, wherein like characters indicate like parts throughout the several views.

Referring to the drawings: Figure 1 is a view in side elevation of a traction wheel having incorporated therein my invention; Fig. 2 is a horizontal transverse section, taken on the line $x^2$ $x^2$ of Fig. 1; Fig. 3 is a detail view partly in side elevation and partly in section, taken on the line $x^3$ $x^3$ of Fig. 1; and Fig. 4 is a perspective view of one of the so-called traction bars and associated parts, some parts being broken away and the exposed parts being shown in section.

The numeral 1 indicates part of the frame work of a traction engine and the numeral 2 indicates the rear axle thereof, on which is journaled a traction wheel.

Of the parts of the traction wheel, the numeral 3 indicates the hub, the numeral 4 the rim, and the numerals 5 and 6 indicate, respectively, the inner and outer sets of spokes. Telescoped onto the inner end of the hub 3, outward of the spokes 5, is a large spur gear, rigidly secured to the rim 1 and driven by any suitable means.

A large disk-like plate 8, perforated at its axis, is telescoped onto the outer end of the hub 3 and is rigidly secured, at its peripheral edge portion, to the spokes 6, by nut equipped U-bolts 9, that embrace the spokes 6 and have their ends passed through perforations in the plate 8. On the outer face of the plate 8, opposite each spoke 6, is a pair of laterally spaced, radially projecting guide bars 10. The outer ends of these guide bars 10 are rigidly secured to the plate 8 by the U-bolts 9, and the inner ends thereof are secured to the plate 8 by nut equipped bolts 11.

Slidably mounted for endwise movement between each pair of guide bars 10 and on the outer face of the plate 8 is a traction bar 12. These traction bars 12 are made rectangular in cross-section and their outer ends are formed with chisel points, arranged to be projected beyond the periphery of the traction wheel. To hold the traction bars 12 between the guide bars 10, flat guide plates 13 are secured to the outer faces of said bars 10 by the U-bolts 9, under which plates 13 the traction bars 12 slidably work.

Coöperative lock dogs 14 and ratchet teeth 15 are provided for locking the traction bars 12 to the traction wheel, so that their pointed ends may be held in different operative positions and in inoperative positions. When operative, said pointed ends project outward of the periphery of the traction wheel, and when inoperative, they are entirely inward of the periphery of said wheel. The ratchet teeth 15 are cut transversely across the intermediate portions of the guide bars 10, and the lock dogs 14 are mounted on the traction bars 12. As best shown in Fig. 4, the intermediate portions of the teeth of the lock dogs 14 are cut away, to clear the underlying traction bars 12. The body portions of the lock dogs 14 are provided with inwardly projecting reduced extensions which terminate in down-turned ears 16 that embrace the sides of the traction bars 12. The lock dogs 14 are secured to the traction bars 12, for pivotal and limited endwise sliding movement on said traction bars, by short pins 17, secured to and projecting from the side of said bars and which pins work in longitudinally extended slots 18, cut in the ears 16. Coiled springs 19 are provided for yieldingly holding the lock dogs 14 interlocked with the ratchet teeth 15. These springs 19 are mounted on nut equipped bolts 20 that are passed transversely through perforations in the traction bars 12 and have their heads seated in the traction bars 12. The springs 19 are held compressed between the lock dogs 14 and washers 21 on the bolts 20. Obviously, by adjusting the nuts of the bolts 20, the tension of the springs 19 may be varied, at will. On the under side of each lock dog 14 is a laterally projecting lug 22, which engages stop shoulders 23, formed by recessing the outer face of each traction bar 12. It will be noted that the interlocking engagement of the lock dogs 14 with the ratchet teeth 15 and the interlocking engagement of their lugs 22 with the shoulders 23 is such as to positively hold the traction bars 12 locked against radial movements toward the axis of the traction wheel.

For automatically setting the traction bars 12 in different operative positions, a variable throw eccentric 24 is mounted on the outer projecting end of the hub 3, for action on roller equipped studs 25, secured to the rear end portions of the traction bars 12. This eccentric 24 is provided with an elongated horizontally extended opening 26, through which the hub 3 projects, and the surrounding portion of said eccentric is slidably mounted in the peripheral groove 27, cut in the hub 3. The elongated opening 26 is so located as to permit the eccentric 24 to be moved from a position concentric with the traction wheel to different positions eccentric thereto. For moving the eccentric 24 and for locking the same in different adjustments, a latch lever 28 is intermediately pivoted to a coöperating latch segment 29, secured to the frame 1. The lower or short end of the lever 28 is connected to the eccentric 24 by a long link 30.

A segmental releasing bar 31, having a cam surface 31ª, is provided for automatically lifting the lock dogs 14 out of engagement with the ratchet teeth 15. One end of this releasing bar 31 is pivotally secured at 32 to the intermediate portion of the link 30. For moving the releasing bar 31 from operative to inoperative positions, a latch lever 33 is pivotally secured to a coöperating latch segment 34, which, in turn, is secured to the frame 1. A link 35 pivotally connects the intermediate portion of the releasing bar 31 with the intermediate portion of the latch lever 33. The releasing bar 31 projects upward and over the hub 3 and, when in one position, is arranged to be engaged successively by the lock dogs 14, under the advanced rotation of the traction wheel which is in the direction of the arrow marked on Fig. 1, and lift the said lock dogs 14, against the tension of the springs 19, out of engagement with the ratchet teeth 15. When the releasing bar 31 is in an inoperative position, as shown in the drawings, its cam surface 31ª underlies the forwardly and upwardly projecting portions of the lock dogs 14, but does not engage the same. As the lock dogs are lifted out of engagement with the ratchet teeth 15, which is at their highest point of travel, the traction bars 12 drop, under the action of gravity, into inoperative positions. As soon as the lock dogs 14 have passed out of engagement with the releasing bar 31, the lock dogs 14 are again pressed into engagement with the ratchet teeth 15 by the springs 19. Obviously during one complete rotation of the traction wheel, all of the traction bars 12 have been moved from operative to inoperative positions. It is evident that during this process of setting the traction bars 12 in inoperative positions, the eccentric 24 must be moved into a position concentric with the axis of the traction wheel. To move the traction bars 12 from inoperative to operative positions, the eccentric 24 is moved by the latch lever 28 into a position eccentric to the axis of the traction wheel and where the same will be successively engaged by the roller equipped stud 25, during the advance movement of the traction wheel. As the traction bars 12 are forced outward by the eccentric 24, the lock dogs 14 will yield and slide over the ratchet teeth 15.

By setting the eccentric in different adjustments, the pointed ends of the traction bars 12 may be projected to a greater or less extent beyond the periphery of the traction wheel, depending on the condition of the road. In case the traction bars 12 become clogged with mud or dirt and do not drop readily, under the action of gravity, from operative to inoperative positions, the segmental bar 31 may be set in a position to be successively engaged by the lugs 22, after the lock dogs 14 have been raised by the segmental bar 31 and thereby force said traction bars 12 into inoperative positions.

The above described device is thought to be highly efficient for the purpose had in view.

What I claim is:

1. The combination with a vehicle wheel, of traction bars slidably mounted in said wheel, means for locking said traction bars in operative and inoperative positions, means for actuating said bar locking means and for moving said traction bars from operative to inoperative positions, and variable means for moving said traction bars from inoperative to operative positions.

2. The combination with a vehicle wheel, of traction bars slidably mounted on said wheel, pawl and ratchet devices for locking said traction bars to said wheel, means for rendering said pawls inoperative, permitting said traction bars to move, under the action of gravity, into inoperative positions, and means for moving said traction bars from inoperative to operative positions.

3. The combination with a vehicle wheel, of traction bars slidably mounted on said wheel, pawl and ratchet devices for locking said traction bars to said wheel, means for rendering said pawls inoperative, permitting said traction bars to move, under the action of gravity, into inoperative positions, and a variable throw eccentric for moving said traction bars from inoperative to operative positions.

4. The combination with a vehicle wheel, of traction bars slidably mounted on said wheel, means for locking said traction bars to said wheel in operative and inoperative positions, means, adapted to be set at will, for moving said traction bars from operative to inoperative positions, and variable means, adapted to be set at will, for moving said traction bars from inoperative to operative positions.

5. The combination with a vehicle wheel, of traction bars slidably mounted on said wheel, pawl and ratchet devices for locking said traction bars to said wheel, a releasing bar for moving said pawls out of engagement with said ratchet devices, and a variable throw eccentric for moving said traction bars from inoperative to operative positions.

6. The combination with a vehicle wheel, of traction bars slidably mounted on said wheel, pawl and ratchet devices for locking said traction bars to said wheel, a releasing bar arranged to be moved into a position to be engaged successively by said pawls, rendering the same inoperative, to permit said traction bars to move into inoperative positions, a variable throw eccentric and studs on said traction bars arranged to successively engage said eccentric to move said traction bars from inoperative to operative positions.

7. The combination with a vehicle wheel, of ratchet bars secured to said wheel, traction bars slidably mounted on said wheel, spring pressed lock dogs carried by said traction bars, coöperating with said ratchet bars to lock said traction bars in operative and inoperative positions, a cam bar operated, at will, for releasing said lock dogs, to permit said traction bars to be moved from operative to inoperative positions, and a variable throw eccentric, operative at will, to move said traction bars from inoperative to operative positions.

8. The combination with a vehicle wheel, of ratchet bars secured to said wheel, traction bars slidably mounted on said wheel, spring pressed lock dogs carried by said traction bars, coöperating with said ratchet bars to lock said traction bars in operative and inoperative positions, a cam bar operated, at will, for releasing said lock dogs, to permit said traction bars to be moved from operative to inoperative positions, a variable throw eccentric, means for moving said eccentric from inoperative to operative positions, and studs on said traction bars arranged to be engaged by said eccentric when in an operative position.

9. The combination with a vehicle wheel, of ratchet bars secured to said wheel, traction bars slidably mounted on said wheel, spring pressed lock dogs carried by said traction bars, coöperating with said ratchet bars to lock said traction bars in operative and inoperative positions, a cam bar, means including a latch lever and coöperating segment for setting said cam bar in different adjustments, a variable throw eccentric, and means including a latch lever and coöperating segment for setting said eccentric in an inoperative position and in different operative positions.

In testimony whereof I affix my signature in presence of two witnesses.

MANCEL W. PETERSON.

Witnesses:
ARTHUR J. PETERSON,
N. C. PETERSON.